(12) United States Patent
Bogardus

(10) Patent No.: US 6,542,185 B1
(45) Date of Patent: Apr. 1, 2003

(54) METHOD AND APPARATUS FOR AUTOMATED OPTIMIZATION OF WHITE AND COLOR BALANCE ON VIDEO CAMERA

(75) Inventor: David W. Bogardus, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/003,841

(22) Filed: Jan. 7, 1998

(51) Int. Cl.⁷ .......................... H04N 9/73; H04N 17/00
(52) U.S. Cl. .................... 348/223.1; 348/188
(58) Field of Search .............. 348/187, 188, 348/223, 225, 228, 655, 223.1, 225.1, 228.1

(56) References Cited

U.S. PATENT DOCUMENTS

| | | | | |
|---|---|---|---|---|
| 4,575,124 A | * | 3/1986 | Morrison | 348/188 |
| 4,626,893 A | * | 12/1986 | Yamanaka | 348/223 |
| 4,845,551 A | * | 7/1989 | Matsumoto | 348/223 |
| 4,991,007 A | * | 2/1991 | Corley | 348/188 |
| 5,157,497 A | * | 10/1992 | Topper et al. | 348/251 |
| 5,179,437 A | * | 1/1993 | Kawada et al. | 348/188 |
| 5,181,098 A | * | 1/1993 | Guerin et al. | 348/187 |
| 5,351,201 A | * | 9/1994 | Harshbarger, Jr. et al. | 348/187 |
| 5,363,318 A | * | 11/1994 | McCauley | 358/512 |
| 5,644,359 A | * | 7/1997 | Ito | 348/223 |
| 5,926,562 A | * | 7/1999 | Hyodo et al. | 348/223 |
| 6,016,161 A | * | 1/2000 | Robinson | 348/187 |
| 6,205,244 B1 | * | 3/2001 | Bawolek et al. | 348/187 |
| 6,256,062 B1 | * | 7/2001 | Endo | 348/223 |

OTHER PUBLICATIONS

Recommendation ITU–R BT.601–4, Encoding Parameters of Digital Television for Studios, (Questions ITU–R 25/11, ITU–R60/11 and ITU–R 61/11), (1982–1986–1990–1992–1994), pp. 1–13.

* cited by examiner

Primary Examiner—Wendy R. Garber
Assistant Examiner—Jacqueline Wilson
(74) Attorney, Agent, or Firm—Blakely, Sokoloff, Taylor & Zafman, LLP

(57) ABSTRACT

An image of an optical target including dark and light monochromatic patches is captured. An average YUV value is calculated from a predetermined number of YUV values for each monochromatic patch. A white balance is performed using the averaged YUV values and a predetermined reference image. Each averaged YUV value is converted to an equivalent RGB value. A difference in RGB values between the light and the dark monochromatic patches produces a dynamic range for the RGB values. The dynamic range for the G value is adjusted to match the dynamic range for a G' value of the predetermined reference image.

36 Claims, 8 Drawing Sheets

| R,G,B → Y | Y = (0.257 * R)+(0.504 * G)+(0.098 * B)+16. |
|---|---|
| R,G,B → U | U = (-0.148 * R)+(-0.291 * G)+(0.439 * B)+128. |
| R,G,B → V | V = (0.439 * R)+(-0.368 * G)+(-0.071 * B)+128. |
| Y,U,V → R | R = (1.164 * (Y-16.))+(-0.001 * (U-128.))+(1.596 * (V-128.)) |
| Y,U,V → G | G = (1.164 * (Y-16.))+(-0.391 * (U-128.))+(-0.813 * (V-128.)) |
| Y,U,V → B | B = (1.164 * (Y-16.))+(2.017 * (U-128.))+(0.001 * (V-128.)) |

FIG. 3

METHOD AND APPARATUS FOR AUTOMATED OPTIMIZATION OF WHITE AND COLOR BALANCE ON VIDEO CAMERA

BACKGROUND OF THE INVENTION (1) Field of the Invention

The field of the invention is calibration of a video capture device, more specifically the present invention is a method and an apparatus for automated optimization of white and color balance on a video camera.

(2) Related Art

Presently available video cameras are often equipped with various manual calibration features including white balance which allows the manual calibration of white images. Lighting is an important factor in the process of accurate video capture of clear white and color balanced images. Typically, when a video camera is turned on in an arbitrary lighting environment, the target captured by the video camera may not be perceived in the correct color. For example, whites may not be perceived as white and human faces may be captured with a slight green tint.

There are various disadvantages inherent in the video capture method of prior art technology. For example, presently available video cameras are typically equipped with manual white balancing function which adjusts "white" targets captured by a video camera and fine tunes the "white" into a more realistic shade of white. Unfortunately, it is difficult to correctly perform manual white balance due to the operator judgment and intervention required to set color controls. Furthermore, the manual white balancing function of prior art is catered to adjusting white and does not necessarily work for adjusting colors. Additionally, an auto white balancing function available in some video cameras may work poorly since no white reference is provided for the video camera to make the white color adjustment.

It is therefore desirable to provide an automatic method and apparatus to calibrate white as well as color for targets captured by a video camera.

BRIEF SUMMARY OF THE INVENTION

A method for optimizing white and color balance on a video capture device is disclosed. The method comprises the steps of capturing an image of an optical target through the video capture device and calibrating the captured image using a predetermined reference image having desired white and color parameters. The calibration results in the captured image matching the predetermined reference image.

BRIEF DESCRIPTION OF THE DRAWINGS

FIG. 3 is a table illustrating derivation of YUV color and white representation as derived from standard RGB color.

DETAILED DESCRIPTION OF THE INVENTION

The present invention is a method and an apparatus for optical target and calibration software for automated optimization of color balance on video cameras. The present invention uses an optical target in combination with calibration software capable of recognizing the optical target. The calibration software adjusts the camera until the perceived image matches the correct image available to the calibration software. More specifically, the optical target includes both white and non-white colors of known intensity. Since the calibration software has knowledge of the correct appearance of the optical target, the calibration software is capable of adjusting the video camera's response such that the image observed matches the image's known characteristics. Once having been adjusted for a given light condition, any other objects then observed under the same lighting conditions will appear in their true and accurate colors as captured by the video camera.

The present invention may reduce operator intervention. Further, the present invention may automatically align the observed image of the optical target with a stored reference image and adjusts for a minimum difference between the observed image and the reference image.

Figure 1:
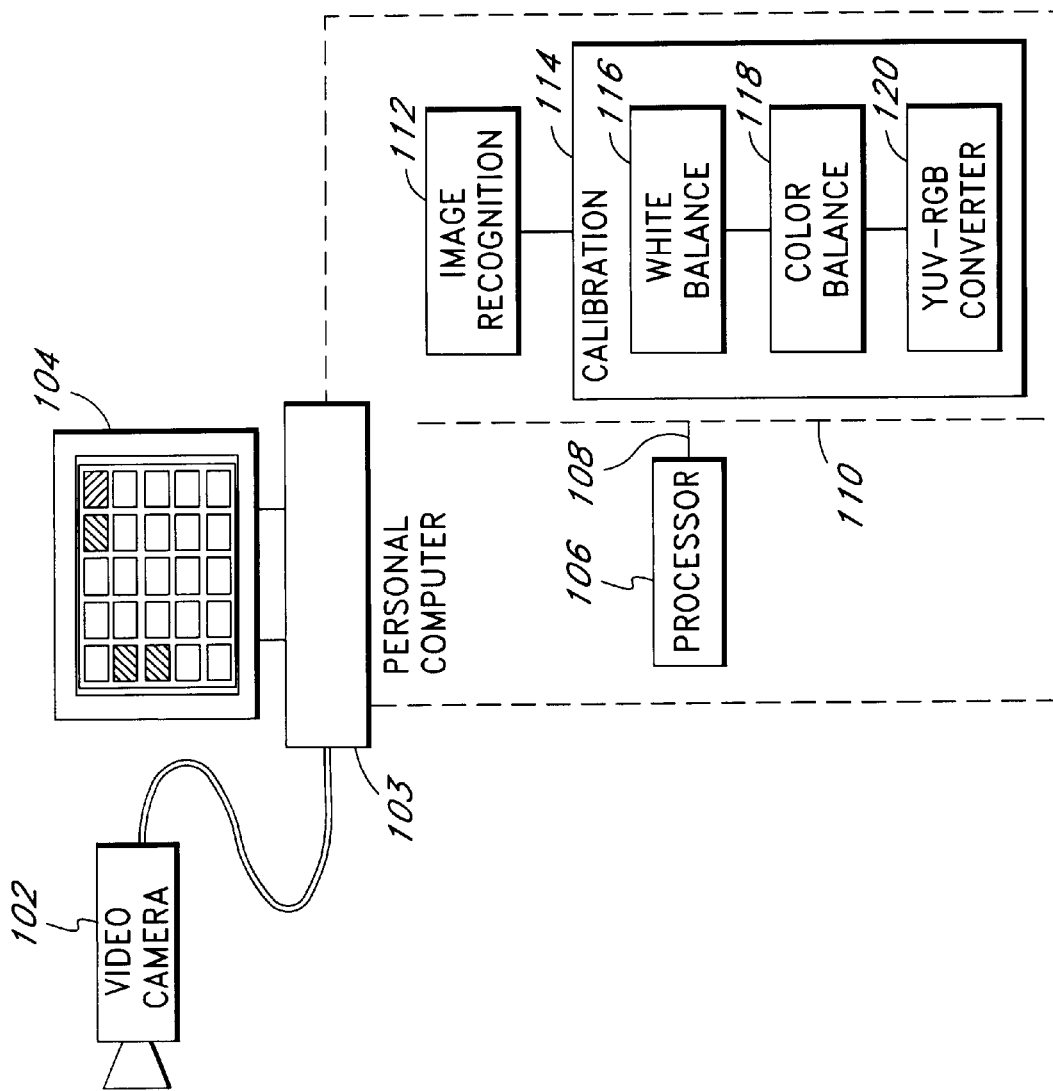
FIG. 1 is an exemplary system block diagram of the present invention.
Figure 1:
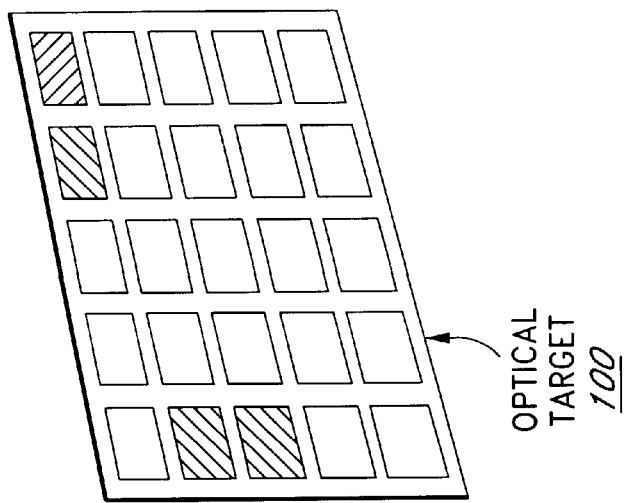

FIG. 1 is an exemplary illustration of the system of the present invention. A personal computer (PC) 103 is coupled to a video camera 102. The video camera 102 is directed to an optical target 100 with a Y, U, V color chart optimized for image recognition and a gray background denoted by hatching.

More specifically, Y represents luminance, separate from color, and denotes a brightness scale somewhere between black and white. U and V are color difference values describing colors. A more detailed specification of the Y, U, V color representation may be found in Recommendation ITU-R BT.601-4, Encoding Parameters of Digital Television for Studios, International Telecommunications Union, published in 1994.

The computer 103 is further coupled to a display device 104 such as a computer monitor to display the optical target as captured by the video camera and an input device (not shown) such as a keyboard and/or mouse allowing a user to initiate the automatic color and white balance using the present invention's image recognition 112 and calibration 114 mechanisms. The image recognition mechanism 112 and calibration mechanism 114 reside in a storage element 110 which is coupled to a processor 106 by a bus 108. The calibration mechanism 114 has a white balancer 116, a color balancer 118 and a YUV-RGB converter 120 all used in automatically calibrating the video capture device 102.

The processor 106 runs the image recognition mechanism 112 and the calibration mechanism 114 upon initiation of the mechanisms by a user input through a graphic user interface (GUI) (not shown). Given the detailed description of the present invention provided herein, a person skilled in the art would be able to generate a GUI suitable to initiate the image recognition and calibration mechanisms 112 and 114, respectively, of the present invention.

The image recognition mechanism 112 and the calibration mechanism 114 of the present invention may also reside in a remote storage element coupled to the computer 103 for example through a network such as a wide area network (WAN) or a local area network (LAN).

Figure 2:
FIG. 2 is an exemplary optical target used by the present invention in adjusting white and color balance.

FIG. 2 is an exemplary reference image which is compared to the perceived image of the optical target. The optical target perceived by the video camera is identical in format and actual white and color configuration as its corresponding reference image. Any deviation is created by the video camera's inaccurate perception of the white and color values of the optical target. Additionally, as was shown in FIG. 1, the optical target has a background such as gray which separates each patch in the target. As will be described later, the background is only necessary for the image recognition mechanism of the present invention in distinguishing and ultimately identifying each patch in the optical target and is not necessary to perform the comparison between the perceived optical target and the reference image. Thus, the background is irrelevant in the case of the reference image illustrated in FIG. 2.

With the present invention, a video capture device first captures an image of the optical target. The video capture device then aligns its frame against the optical target by utilizing an image recognition mechanism to recognize that there are 5 columns of patches (or 5 rows of patches) at an equal distance from each other. Once the video camera frame is properly aligned with the optical target, the video capture device and the present invention's calibration mechanism is ready to calibrate the white and color balance of any image under the same lighting.

The present invention's calibration mechanism has access to a "perfect" copy of the optical target as represented in numerics of Y, U, V values also referred herein as a reference image. The optical target as captured by the video camera is then compared against the reference image by the calibration mechanism to calibrate the video capture device.

More specifically, a reference image 200 is an array of 25 rectangles having Y, U, V values depicting various specially selected colors. The reference image 200 (as is the optical target) represents a bit-map where each color unit (pixel) may be located in an X-Y axis configuration.

The exemplary reference image specifies varying YUV values for each patch. From left to right, row 1 patch 1 contains the CCIR-601 specification defined legal minimum for Y (luminance). Row 1 patch 2 contains a Y value which is half-way between CCIR-601 specification defined minimum and median. Row 1 patch 3 contains a Y value which is a CCIR-601 specification defined median. Row 1 patch 4 contains a Y value which is half-way between CCIR-601 specification defined median and maximum values. Finally, Row 1 patch 5 contains a Y value which is a CCIR-601 specification defined maximum. The Y values are defined as such all while holding U and V values at 128 which is neutral and represents no color. The U and V values are held at 128 for setting the gain and offset of Y, without interaction from the U and V color difference values.

Rows 2 and 3 are tailored to exercise the U color channel only, except for column 3, which sets the color vector to 315 degrees and 135 degrees, respectively. The vectors in column 3 are chosen to bisect the +U, −V and the −U, +V axis, providing a good linearity check for color. In row 3, the U channel sequentially assumes the following values: patch 1 has a U value which is near the CCIR-601 specification-defined legal minimum, patch 2 has a U value which is half-way between the CCIR-601 specification defined minimum and median values, patch 3 has a U value which sets the color vector to 135 degrees, patch 4 has a U value which is half-way between the CCIR-601 specification defined median and maximum values, and patch 5 has a U value near the CCIR-601 specification defined maximum legal value.

The U values are defined all while holding the V value at 128 (except for column 3), and ensuring that the corresponding R, G, or B values do not saturate beyond legal bounds in their equivalent color space. The table in FIG. 3 describes the YUV to RGB relationships as defined in CCIR-601 in more detail.

The resulting values of the Y values from row 3 are used in row 2 which has monochromatic patches (except for column 3). The row 2 monochromatic patches provide luminance linearity references. More specifically, luminance is a linear function and the degree of luminance may be verified by checking multiple points along the line as defined by the linear function. Here, the monochromatic patches are the reference points which may be used to verify luminance.

Rows 4 and 5 are tailored to exercise the V color channel only, except for column 3, which sets the color vector to 45 degrees and 225 degrees, respectively. The vectors in column 3 are chosen to bisect the +U, +V and the −U, −V axis, providing another good linearity check for color. In row 5, the V color channel sequentially assumes the following values: patch 1 has a V value near the CCIR-601 specification-defined legal minimum, patch 2 has a V value half-way between the CCIR-601 minimum and median, patch 3 has a V value which sets the color vector to 225 degrees, patch 4 has a V value which is half-way between the CCIR-601 median and maximum values, and patch 5 has a V value near the CCIR-601 maximum legal value.

The V values are set while holding U at 128 (except for column 3), and ensuring that the corresponding R, G or B values do not saturate beyond legal bounds in their equivalent color space. The resulting values of Y from row 5 are used in row 4, which has monochromatic patches (except for column 3). The monochromatic patches provide more luminance linearity references.

Other suitable optical targets with varying configurations of YUV and/or RGB values may be realized by a person skilled in the art given the detailed description provided herein.

FIG. 3 is a table illustrating the generation of a YUV color and white representation derived from the CCIR-601 RGB color and white standard. More specifically, the table illustrates the algorithm utilized by the calibration mechanism 114 in performing conversions 300 between YUV and RGB values. The conversion if performed when determining offset and gain values to be provided to the video camera for calibration of the perceived white and color values to match the "perfect" copy of the optical target (i.e. the reference image).

In the illustrated exemplary conversion method, it is assumed that YUV is CCIR-601 compliant. Further, the given method is exemplary for RGB values having a range of 0 to 255, Y value having a range of 16 to 235 and U and V values having a range of 16 to 240.

Figure 4:
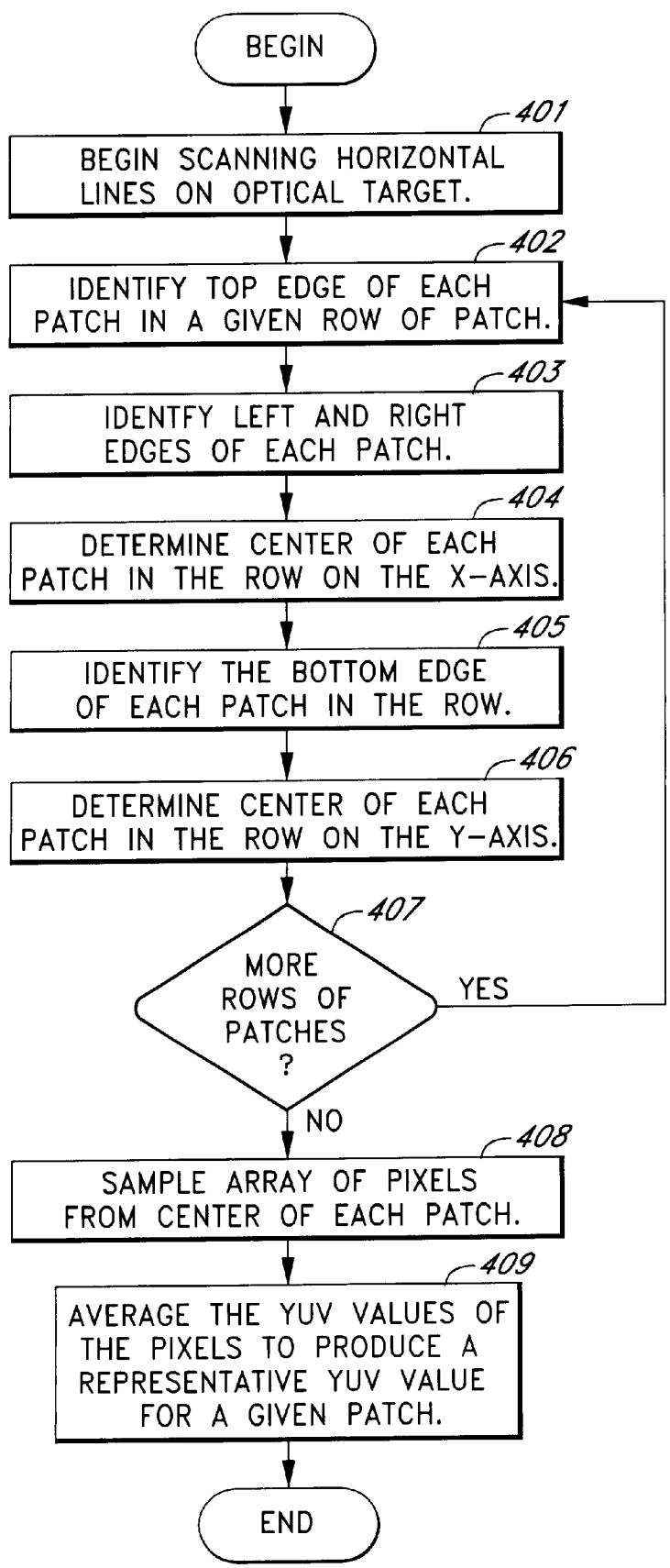
FIG. 4 is a flow diagram illustrating the general steps followed by the present invention in performing image recognition and data extraction from an optical target prior to performing white and color balance.

FIG. 4 is a flow diagram illustrating the general steps followed by the present invention in performing image recognition and data extraction from the optical target using the image recognition mechanism of the present invention. As was illustrated in FIG. 1, an optical target is placed such that the optical target fills the video camera's field of view with all given color patches and the surrounding gray background visible on a monitor coupled to the video camera. The black patch may be oriented in any of the corners of the optical target. The calibration software is then invoked on a computer coupled to the video camera and the monitor. Precise alignment of the optical target with the video camera is unnecessary since the present invention will find a cluster of pixels from the center of each patch as it identifies the patches by image recognition.

More specifically, in step 401, the image recognition mechanism of the present invention scans across successive horizontal lines of the optical target captured by the video camera beginning from the top of the optical target. In step 402, contrast transitions indicative of a transition between the background to the patches are noted from line to line and the top edge of the first row of patches is identified. The background surrounds all patches on the optical target. The contrast transitions are sudden changes in luminance between patches and the background.

The image recognition mechanism then scans successive lines to discern the horizontal structure on the optical target by counting the top edges of each patch, or contrast transitions across horizontal lines and noting that there are five differing wide regions (patches) which are separated by the background. In step 403, successive lines on the captured optical target is scanned and left and right edges (bounds) of each patch are identified by noting the contrast transitions. In step 404, once the left and right bounds of the patches are identified, the center of each patch on an X-axis is calculated For example, the center of a patch on the X-axis may be calculated by subtracting the X-axis value of the left edge of a patch from the X-axis value of the right edge of the patch and dividing the result by two. In step 405, the process is repeated for consecutive horizontal lines until the bottom edge of the top row of patches is reached where the horizontal transitions are no longer seen while the interposing background is being scanned.

In step 406, once the top and bottom bounds of the patches are identified, the location of the center of each patch on the Y-axis is calculated. For example, the center of a patch on the Y-axis may be calculated by subtracting the Y-axis value of the bottom edge of a patch from the Y-axis value of the top edge of the patch and dividing the result by two.

In step 407, after continuing the scan process for several more successive horizontal lines (the height of the background strip between rows of patches), additional contrast transitions are again noted from line to line when the top edge of the second row of patches is scanned. The process is repeated until the left, right, top and bottom boundaries of each row of patches are identified and the center of each patch on the X-axis and the Y-axis are determined.

Since vertical, horizontal and rotational alignment of the optical target and the video camera will likely be imperfect, the exact edge placement of the patches as discerned by the image recognition mechanism will not constitute precise horizontal rows of patches and vertical columns of patches. Consequently, the transitions within a given scan line from within a background boundary to within, for example, five patches, may occur over several scan lines in numbers of increments proportional to the rotational skew of the optical target versus the video camera. The present invention's image recognition approach is intentionally tolerant of these issues since it uses only the greatest observed X and Y extents for each patch and then calculates to find the center of each patch.

In step 408, an array of pixels from the center of each patch is sampled. For example, a 4×4 array of 16 pixels are sampled. In step 409, the bit values of the pixels representative of YUV values for each patch are then averaged. The resulting averaged YUV values one for each patch represent the pre-calibrated response of the video camera to the stimulus of the optical target.

Figure 5A:
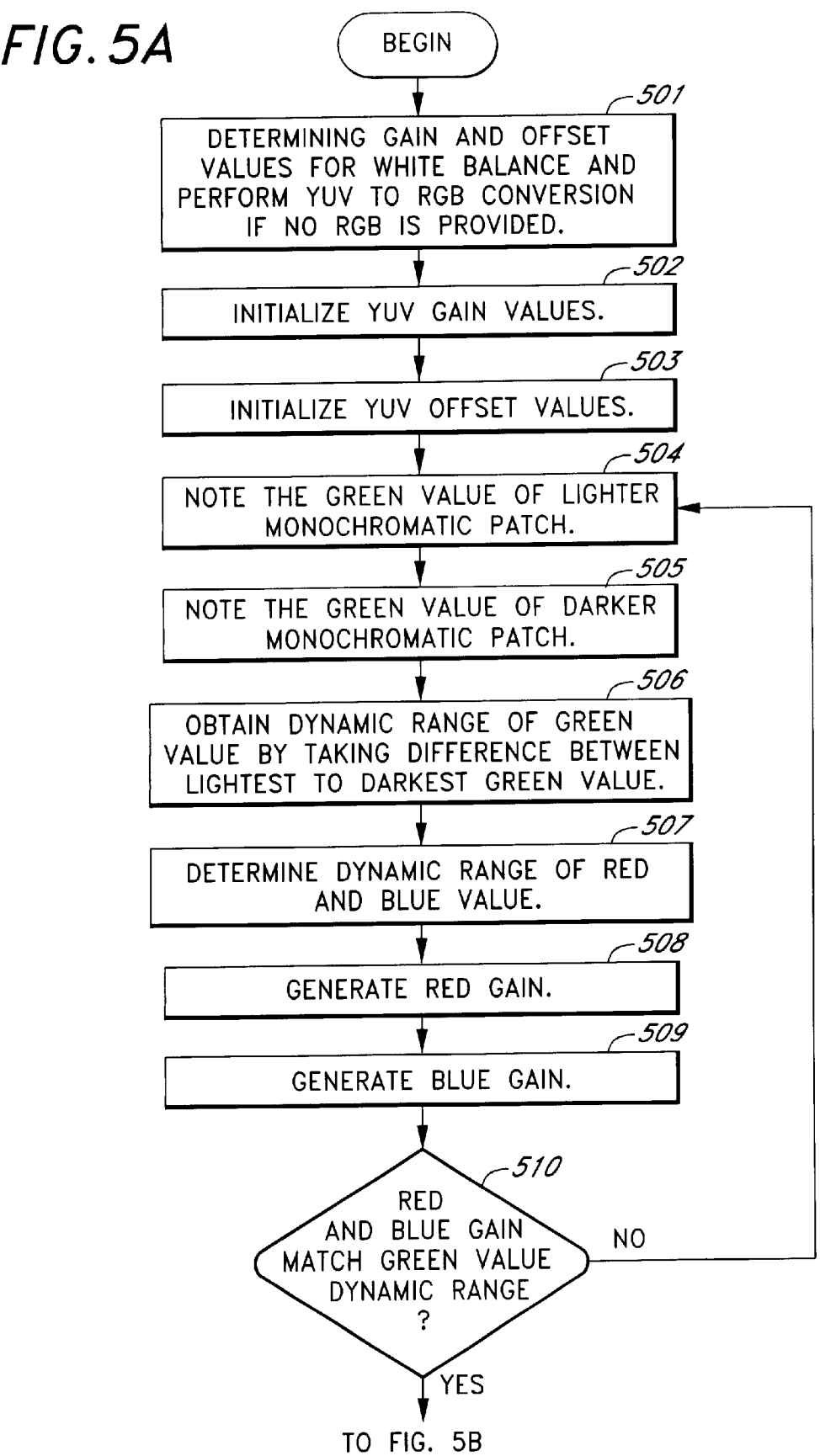
FIGS. 5a–5c are flow diagrams illustrating the general steps followed by the present invention in performing white and color balance of a target image.
Figure 5B:
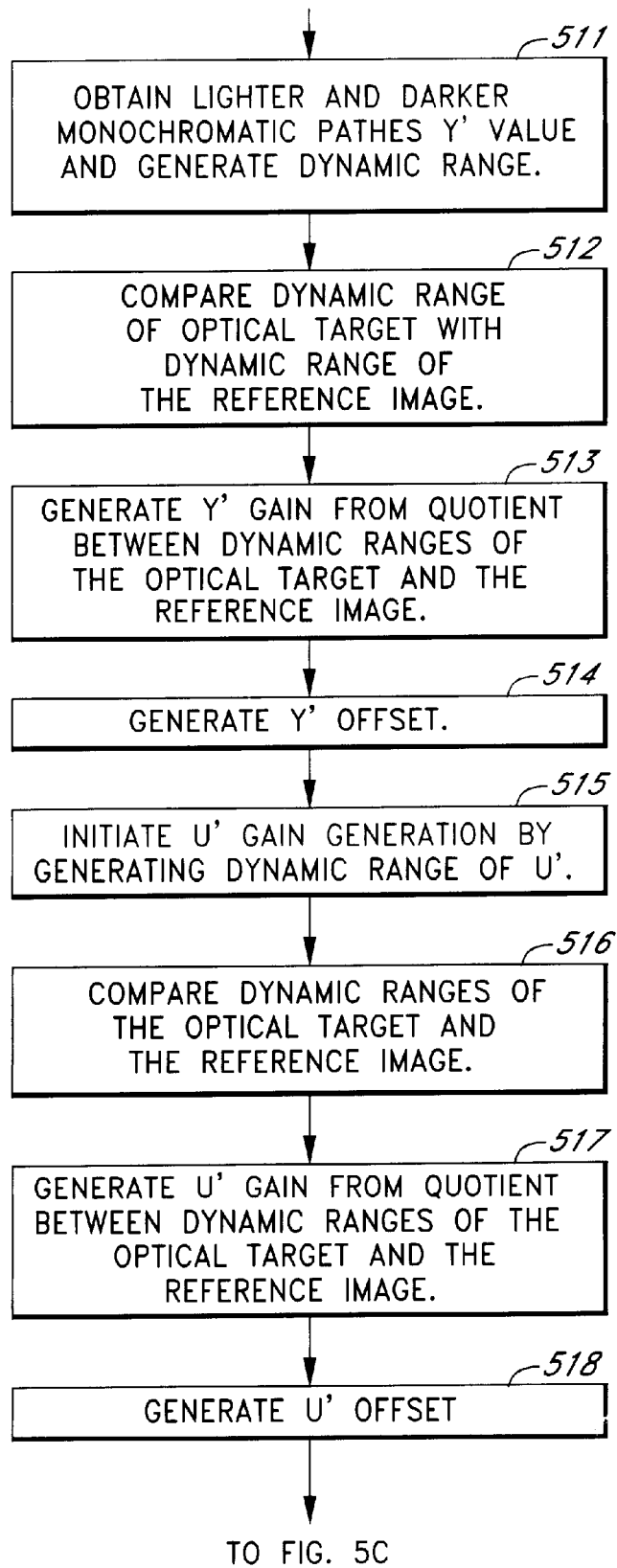
Figure 5C:
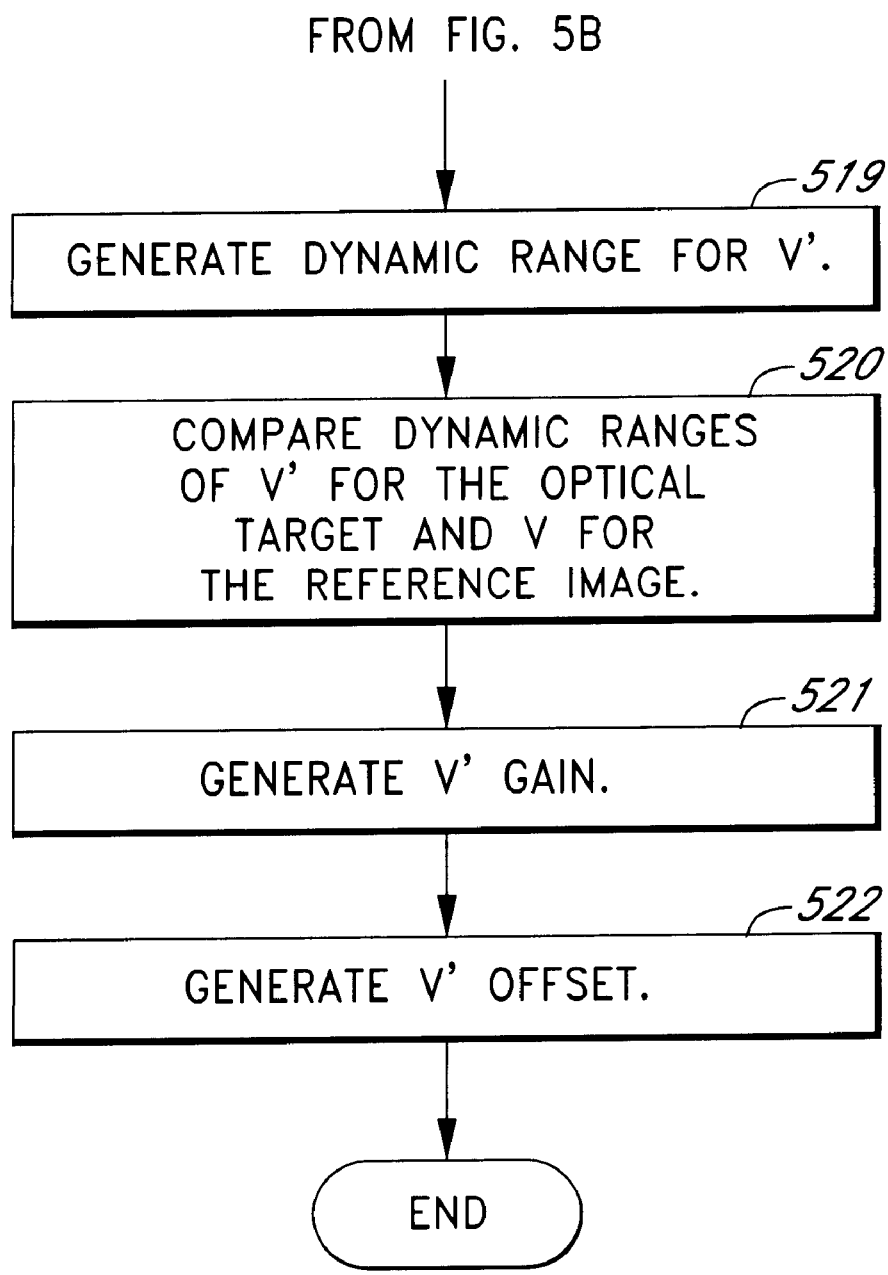

FIGS. 5a–5c are flow diagrams illustrating the general steps followed by the present invention in performing the white and color balance. YUV as referred in FIG. 5 and 6 and the accompanying detailed description is the raw, uncorrected data as perceived by the video camera from the optical target, and Y'U'V' is the gain and offset compensation to the YUV necessary to make them correct.

Figure 6:
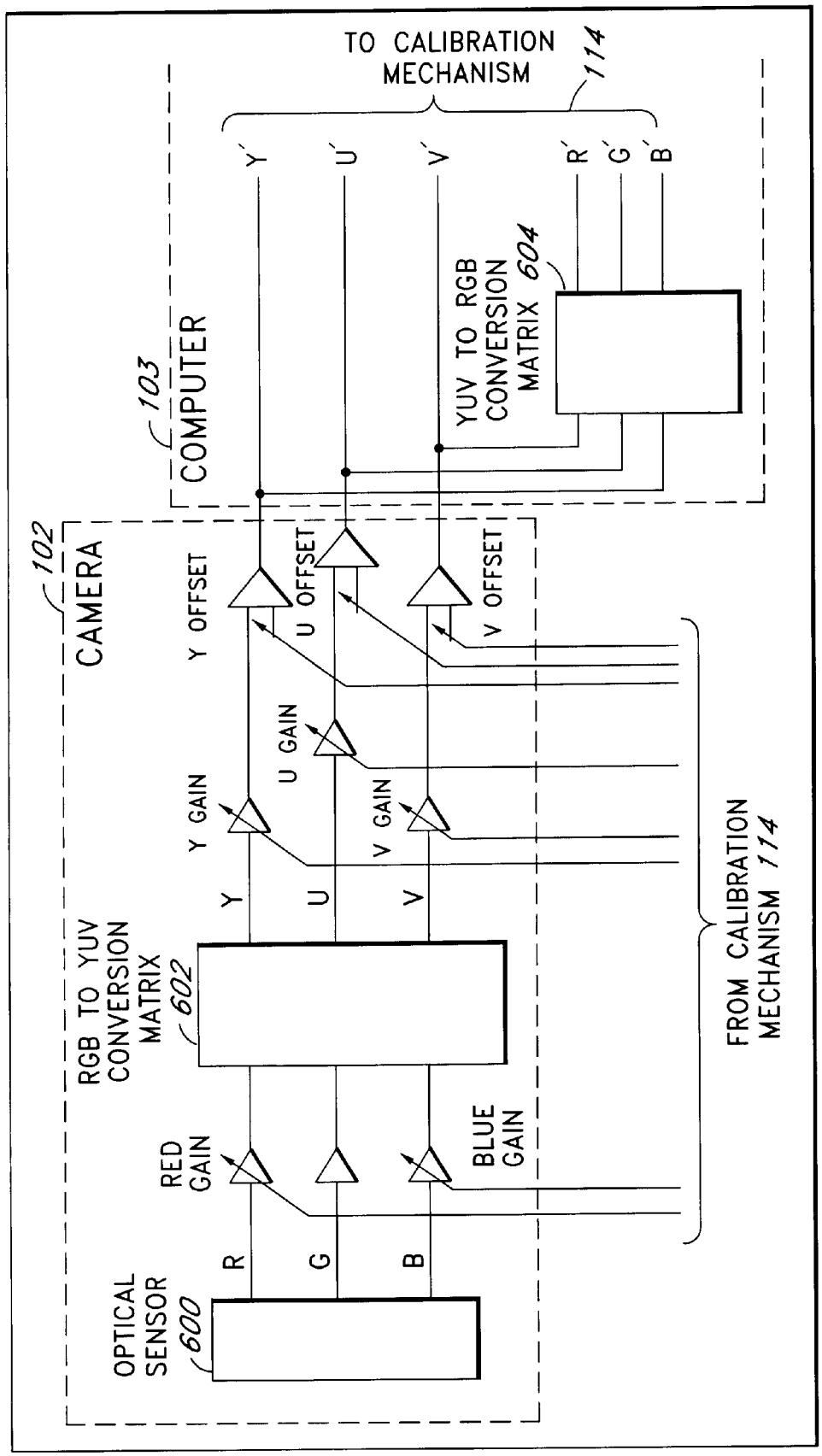
FIG. 6 is a block diagram of an exemplary video camera receiving gain and offset values from a computer.

In step 501, execution of the white balancer of the calibration mechanism is initiated. By convention, white balance must be performed in the RGB (red, green and blue) color space. More specifically, white balance requires calibration of the G value for white. Additionally, the R and B values must be comparatively calibrated against the G value. The calibration mechanism of the present invention must therefore either calculate R'G'B' from the Y'U'V' it obtains from the video camera or a decoder, or use a given R'G'B' directly if the R'G'B' is supplied directly. This YUV to RGB conversion is illustrated in FIG. 6's calibration adjustment and color space conversion matrices.

In step 502, the Y, U and V gain settings are initialized by being set to a nominal value. More specifically, gain is a multiplicative scale factor ranging, for example, from 0.5 to 1.5 used in adjusting raw uncorrected YUV values. A nominal value for a gain setting ranging from 0.5 to 1.5 is 1.0. In step 503, the corresponding offset controls are set to zero. More specifically, offset is an additive correction value added to the raw YUV values and ranges from −20 to +20. The nominal or default value for an offset is 0.

In step 504, the lightest monochromatic patch is examined and its green value is noted by the calibration mechanism. In step 505, the darkest monochromatic patch is examined and its green value is noted. In step 506, the difference in the green values between the lightest monochromatic patch and the darkest monochromatic patch is obtained resulting in a dynamic range of the color green.

In step 507, the red (R) and blue (B) values of the lightest and darkest monochromatic patches are measured as was done for the green (G) value and their differences are computed to produce a dynamic range of red and blue values. In step 508, the red gain is then set such that the resulting dynamic range of the red value from the lightest to the darkest monochromatic patches matches the dynamic range of the green value. In this way, the red, green and blue values are balanced such that white appears white and colors appear in their correct image. In step 509, similarly, the blue gain is set such that its resulting dynamic range from the lightest to the darkest monochromatic patches matches the dynamic range of the green value.

As was described earlier, a gain is a multiplicative scale factor ranging, for example, from 0.5 to 1.5 used in adjusting raw uncorrected YUV values. Once the dynamic ranges of red and blue values are determined, the gain may be determined by generating a multiplicative scale factor which when multiplied with the dynamic ranges of the red and blue values results in the dynamic range of the green value. For example, the following depicts an exemplary generation of the gain for the red value of a given patch:

gain for R=dynamic range of G/dynamic range of R.

In step 510, if the red and blue gains do not have enough range to match the green value in dynamic range, for example, due to saturation from Y, U or V gain or offset errors, the second darkest and the second lightest monochromatic patches are used as bounds for measuring a dynamic range for the red and blue values. For example, the second darkest patch in the optical target illustrated in FIG. 2 is in the second row, fifth column, and the second lightest patch is in the second row, first column. The process of determining the gain red and blue values are repeated for successively lighter and darker patches until the dynamic range of the red and blue values match those of the green value. Once the white balance has been calibrated in this way, the execution of the color balancer of the calibration mechanism performs the color balance beginning with determining the Y' gain.

In step 511, the lightest and the darkest monochromatic patches are examined with the benefit of the correct white balance. In step 512 the observed dynamic range of Y' from the lightest to the darkest monochromatic patches is compared with the pre-determined dynamic range of the corresponding patches on the reference image. In step 513, the Y' gain is adjusted such that the dynamic ranges between the observed optical target and reference image match. In step 514, the Y' offset is adjusted such that the absolute values of Y' match the reference values shown in the chart for both light and dark patches.

Next, the U' gain is calibrated. In step 515, the patches having the highest and lowest levels of U' are examined with the benefit of the correct white balance. In step 516, the observed dynamic range of U' from the highest and lowest levels of U' patches is compared with the pre-determined dynamic range of the corresponding patches on the reference image. In step 517, the U' gain is adjusted such that the dynamic ranges between the observed target and the reference image match. In step 518, the U' offset is adjusted such that U' is set to 128 (neutral=no color) when all of the top row of monochromatic patches is examined.

Next, the V' gain is calibrated. In step 519, the patches having the highest and lowest levels of V' are examined with the benefit of the correct white balance. In step 520, the observed dynamic range of V' from the highest and lowest levels of V' patches is compared with the pre-determined dynamic range of the corresponding patches on the reference image. In step 521, the V' gain is adjusted by increasing or decreasing the gain such that the dynamic ranges between the observed target and the reference optical target match. In step 522, the V' offset is adjusted such that V' is set to 128 (neutral=no color) when all of the top row of monochromatic patches is examined. In this way, both the white balance and the color balance are calibrated.

In the illustrated embodiment, to ensure color calibration accuracy, a "best fit" curve fitting approach may be used to minimize linearity errors at the cost of more computer host-based computing effort.

FIG. 6 illustrates exemplary calibration adjustment and color space conversion matrices. The video camera 102 captures an image of the optical target 100 through an optical sensor 600 and forwards the information to the computer 103 running the present invention's calibration mechanism. The information is converted from RGB to YUV values by conversion block 602 and is converted from analog to digital through for example an analog-to-digital converter (ADC) (not shown). The Y'U'V' values are converted to R'G'B' by a conversion block 604 in the computer 103. Once the gain and offset values for the YUV and the corresponding RGB values are automatically calculated by the computer through the calibration mechanism 114, the gain and offset values are forwarded to the video camera 102 after they are converted from digital to analog form through for example a digital-to-analog converter (DAC) (not shown). The video camera 102 then utilizes the gain and offset values to calibrate its white and color perception under the given lighting. The method by which a video camera calibrates white and color perception once gain and offset values are provided is well known in the art and needs no further explanation.

What has been described is a method and apparatus for automatically calibrating a video capture device given an optical target with a plurality of white and color patches. Once the video capture device perceives an image of the optical target, an image recognition mechanism identifies the perceived image. The identified image is then compared to a "perfect" copy of the optical target (also referred herein as a reference image). The calibration mechanism then determines gain and offset values for each patch. The gain and offset values generated will calibrate the video capture device to have a perception of the optical target which matches the reference image. Once generated, the gain and offset values are forwarded to the video capture device to complete the calibration process.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for calibrating a video capture device comprising:

capturing an image of an optical target that includes a dark monochromatic patch having a YUV color value with a Y value less than a median Y value and a light monochromatic patch having a YUV color value with a Y value greater than the median Y value, each monochromatic patch having U and V values that are neutral;

taking a predetermined number of YUV values from each monochromatic patch;

calculating an average YUV value for each monochromatic patch;

performing white balance using the averaged YUV values and a predetermined reference image;

converting each averaged YUV value to an equivalent RGB value;

taking a difference in RGB values between the light monochromatic patch and the dark monochromatic patch to produce a dynamic range for the RGB values; and adjusting the dynamic range for the G value to match the dynamic range for a G' value of the predetermined reference image.

2. The method of claim 1 further comprising performing image recognition on the optical target to recognize each monochromatic patch.

3. The method of claim 1 wherein the optical target further includes additional monochromatic patches having neutral values for U and V and Y values less than the Y value of the light monochromatic patch and greater than the Y value of the dark monochromatic patch, the method further comprising taking a second difference between successively lighter and darker monochromatic patches until the second difference is capable of matching the dynamic range of the corresponding patches on the predetermined reference image.

4. The method of claim 1 further comprising determining whether the dynamic ranges of the R and B values match the dynamic range of the G value.

5. The method of claim 4 wherein the optical target further includes additional monochromatic patches having neutral values for U and V and Y values less than the Y value of the light monochromatic patch and greater than the Y value of the dark monochromatic patch, the method further comprising taking the difference in R and B values of successive lighter and darker monochromatic patches until the dynamic ranges of said R and B values are capable of matching the dynamic range of said G value.

6. The method of claim 5 further comprising calculating a gain value for the R and B values to match the dynamic range of the R and B values to the dynamic range of the G value.

7. The method of claim 6 further comprising calculating a gain and an offset for the Y value to match the dynamic range of the Y value to the dynamic range of the corresponding patches on the predetermined reference image.

8. The method of claim 1 wherein the optical target further includes:
   a first U calibration patch having a YUV color value with a U value less than a median U value, a Y value chosen such that resulting R, G, and B values are valid, and a V value that is neutral; and
   a second U calibration patch having a YUV color value with a U value greater than a median U value, a Y value chosen such that resulting R, G, and B values are valid, and a V value that is a neutral;
   the method further comprising:
      taking the difference in U values between the first U calibration patch and the second U calibration patch to produce a dynamic range for the U value; and
      adjusting a gain for the U value to match the dynamic range for the U value to the corresponding dynamic range in the predetermined reference image.

9. The method of claim 8 wherein the optical target further includes:
   a third U calibration patch having a YUV color value with a Y value equal to the Y value of the first U calibration patch, and U and V values that are neutral; and
   a fourth U calibration patch having a YUV color value with a Y value equal to the Y value of the second U calibration patch, and U and V values that are neutral;
   the method further comprising verifying the luminance with the third and fourth U calibration patches.

10. The method of claim 8 wherein the optical target further includes:
    a first V calibration patch having a YUV color value with a V value less than a median V value, a Y value chosen such that resulting R, G, and B values are valid, and a U value that is neutral; and
    a second V calibration patch having a YUV color value with a V value greater than a median V value, a Y value chosen such that resulting R, G, and B values are valid, and a U value that is neutral;
    the method further comprising:
       taking the difference in V values between the first V calibration patch and the second V calibration patch to produce a dynamic range for the V value; and
       adjusting a gain for the V value to match the dynamic range for the V value to the corresponding dynamic range In the predetermined reference image.

11. The method of claim 10 wherein the optical target further includes:
    a third V calibration patch having a YUV color value with a Y value equal to the Y value of the first V calibration patch, and U and V values that are neutral; and
    a fourth V calibration patch having a YUV color value with a Y value equal to the Y value of the second V calibration patch, and U and V values that are neutral; and
    the method further comprising verifying the luminance with the third and fourth V calibration patches.

12. The method of claim 10 wherein the optical target further includes:
    a first color calibration patch having a YUV color value which sets the color vector to 135 degrees;
    a second color calibration patch having a YUV color value which sets the color vector to 315 degrees;
    a third color calibration patch having a YUV color value which sets the color vector to 45 degrees; and
    a fourth color calibration patch having a YUV color value which sets the color vector to 225 degrees; and
    the method further comprising verifying color linearity with the first, second, third, and fourth color calibration patches.

13. An apparatus for video calibration comprising:
    a video capture device configured to capture an image of an optical target that Includes a dark monochromatic patch having a YUV color value with a Y value less than a median Y value and a light monochromatic patch having a YUV color value with a Y value greater than the median Y value, each monochromatic patch having U and V values that are neutral;
    a sampling device configured to take a predetermined number of YUV values from each monochromatic patch;
    an arithmetic device configured to calculate an average YUV value for each monochromatic patch:
    a white balance device configured to perform white balance using the averaged YUV values and a predetermined reference image;
    a conversion block configured to convert each averaged YUV value to an equivalent RGB value;
    a second arithmetic device configured to adjust the dynamic range for the G value to match the dynamic range for a G' value of the is predetermined reference image.

14. The apparatus of claim 13 further comprising an image recognition device configured to recognize each monochromatic patch on the optical target.

15. The apparatus of claim 13 wherein the optical target further includes additional monochromatic patches having neutral values for U and V and Y values less than the Y value of the light monochromatic patch and greater than the Y value of the dark monochromatic patch, the apparatus further comprising a third arithmetic device configured to take a second difference between successively lighter and darker monochromatic patches until the second difference is capable of Matching the dynamic range of the corresponding patches on the predetermined reference image.

16. The apparatus of claim 13 further comprising a matching device configured to determine whether the dynamic ranges of the R and B values match the dynamic range of the G value.

17. The apparatus of claim 16 wherein the optical target further includes additional monochromatic patches having neutral values for U and V and Y values less than the Y value of the light monochromatic patch and greater than the Y value of the dark monochromatic patch, the apparatus further comprising a third arithmetic device configured to take the difference in R and B values of successive lighter and darker monochromatic patches until the dynamic ranges of said R and B values are capable of matching the dynamic range of said G value.

18. The apparatus of claim 17 further comprising a fourth arithmetic device configured to calculate a gain value for the R and B values to match the dynamic range of the R and B values to the dynamic range of the G value.

19. The apparatus of claim 18 further comprising a fifth arithmetic device configured to calculate a gain and an offset for the Y value to match the dynamic range of the Y value to the dynamic range of the corresponding patches on the predetermined reference image.

20. The apparatus of claim 13 wherein the optical target further includes:
   a first U calibration patch having a YUV color value with a U value less than a median U value, a Y value chosen such that resulting R, G, and B values are valid, and a V value that is neutral; and
   a second U calibration patch having a YUV color value with a U value greater than a median U value, a Y value chosen such that a resulting R, G, and B values are valid, and a V value that is neutral;
   the apparatus further comprising:
      a third arithmetic device configured to take the difference in U values between the first U calibration patch and the second U calibration patch to produce a dynamic range for the U value; and
      a fourth arithmetic device configured to adjust a gain for the U value to match the dynamic range for the U value to the corresponding dynamic range in the predetermined reference image.

21. The apparatus of claim 20 wherein the optical target further includes:
   a third U calibration patch having a YUV color value with a Y value equal to the Y value of the first U calibration patch, and U and V values that are neutral; and
   a fourth U calibration patch having a YUV color value with a Y value equal to the Y value of the second U calibration patch, and U and V values that are neutral; and
   the apparatus further comprising a verifier configured to verify the luminance with the third and fourth U calibration patches.

22. The apparatus of claim 20 wherein the optical target further includes:
   a first V calibration patch having a YUV color value with a V value less than a median V value, a Y value chosen such that resulting R, G, and B values are valid, and a U value that is neutral; and
   a second V calibration patch having a YUV color value with a V value greater than a median V value, a Y value chosen such that resulting R, G, and B values are valid, and a U value that is neutral;
   the apparatus further comprising:
      a fifth arithmetic device configured to take the difference In V values between the first V calibration patch and the second V calibration patch to produce a dynamic range for the V value; and
      a sixth arithmetic device configured to adjust a gain for the V value to match the dynamic range for the V value to the corresponding dynamic range in the predetermined reference image.

23. The apparatus of claim 22 wherein the optical target further includes:
   a third V calibration patch having a YUV color value with a Y value equal to the Y value of the first V calibration patch, and U and V values that are neutral; and
   a fourth V calibration patch having a YUV color value with a Y value equal to the Y value of the second V calibration patch, and U and V values that are neutral;
   the apparatus further comprising a verifier configured to verify the luminance with the third and fourth V calibration patches.

24. The apparatus of claim 22 wherein the optical target further includes:
   a first color calibration patch having a YUV color value which sets the color vector to 135 degrees;
   a second color calibration patch having a YUV color value which sets the color vector to 315 degrees;
   third color calibration patch having a YUV color value which sets the color vector to 45 degrees; and
   a fourth color calibration patch having a YUV color value which sets the color vector to 225 degrees; and
   the apparatus further comprising a verifier configured to verify color linearity with the first, second, third, and fourth color calibration patches.

25. A storage medium having stored therein a plurality of programming instructions designed for execution by a processor, wherein when executed, the programming instructions calibrates a video capture device, said storage medium comprising:
   an image module, execution of said image module configured to e receive an image of an optical target that includes a dark monochromatic patch having a YUV color value with a Y value less than a median Y value and a light monochromatic patch having a YUV color value with a Y value greater than the median Y value, each monochromatic patch having U and V values that are neutral;
   a sampling module, execution of said sampling module configured to take a predetermined number of YUV values from each monochromatic patch;
   a white balance module, execution of said white balance module configured to perform white balance using the averaged YUV values and a predetermined reference image;
   a conversion module, execution of said conversion module configured to convert each averaged YUV value to an equivalent RGB value;
   a second arithmetic module, execution of said second arithmetic module configured to adjust the dynamic range for the G value to match the dynamic range for a G' value of the predetermined reference image.

26. The storage medium of claim 25 further comprising an image recognition module, execution of said image recognition module configured to recognize each monochromatic patch on the optical target.

27. The storage medium of claim 25 wherein the optical target further includes additional monochromatic patches having neutral values for U and V and V values less than the Y value of the light monochromatic patch and greater than the Y value of the dark monochromatic patch, the storage medium further comprising a third arithmetic module, execution of said third arithmetic module configured to take a second difference between successively lighter and darker monochromatic patches until the second difference is capable of matching the dynamic range of the corresponding patches on the predetermined reference image.

28. The storage medium of claim 25 further comprising a matching module, execution of said matching module configured to determine whether the dynamic ranges of the R and B values match the dynamic range of the G value.

29. The storage medium of claim 28 wherein the optical target further includes additional monochromatic patches having neutral values for U and V and Y values less than the Y value of the light monochromatic patch and greater than the Y value of the dark monochromatic patch, the storage medium further comprising a third arithmetic module, execution of said third arithmetic module configured to take the difference in R and B values of successive lighter and darker monochromatic patches until the dynamic ranges of said R and B values are capable of matching the dynamic range of said G value.

30. The storage medium of claim 29 further comprising a fourth arithmetic module, execution of said fourth arithmetic module configured to calculate a gain value for the R and B values to match the dynamic range of the R and B values to the dynamic range of the G value.

31. The storage medium of claim 30 further comprising a fifth arithmetic module, execution of said fifth arithmetic module configured to calculate a gain and an offset for the Y value to match the dynamic range of the Y value to the dynamic range of the corresponding patches on the predetermined reference image.

32. The storage medium of claim 25 wherein the optical target further includes:
   a first U calibration patch having a YUV color value with a U value less than a median U value, a Y value chosen such that resulting R, G, and B values are valid, and a V value that is neutral; and
   a second U calibration patch having a YUV color value with a U value greater than a median U value, a Y value chosen such that resulting R, G, and B values are valid, and a V value that is neutral;
   the storage medium further comprising;
      a third arithmetic module, execution of said third arithmetic module configured to take the difference in U values between the first U calibration patch and the second U calibration patch to produce a dynamic range for the U value; and
      a fourth arithmetic module, execution of said fourth arithmetic module configured to adjust a gain for the U value to match the dynamic range for the U value to the corresponding dynamic range In the predetermined reference image.

33. The storage medium of claim 32 wherein the optical target further includes:
   a third U calibration patch having a YUV color value with a Y value equal to the Y value of the first U calibration patch, and U and V values that are neutral; and
   a fourth U calibration patch having a YUV color value with a Y value equal to the Y value of the second U calibration patch, and U and V values that are neutral;
   the storage medium further comprising a verifier module, execution of said verifier module configured to verify the luminance with the third and fourth U calibration patches.

34. The storage medium of claim 32 wherein the optical target further includes:
   a first V calibration patch having a YUV color value with a V value less than a median V value, a Y value chosen such that resulting R, G, and B values are valid, and a U value that is neutral; and
   a second V calibration patch having a YUV color value with a V value greater than a median V value, a Y value chosen such that resulting R, G, and B values are valid, and a U value that is neutral;
   the storage medium further comprising:
      a fifth arithmetic module, execution of said fifth arithmetic module configured to take the difference in V values between the first V calibration patch and the second V calibration patch to produce a dynamic range for the V value; and
      a sixth arithmetic module, execution of said sixth arithmetic module configured to adjust a gain for the V value to match the dynamic range for the V value to the corresponding dynamic range in the predetermined reference image.

35. The storage medium of claim 34 wherein the optical target further includes:
   a third V calibration patch having a YUV color value with a Y value equal to the Y value of the first V calibration patch, and U and V values that are neutral; and
   a fourth V calibration patch having a YUV color value with a Y value equal to the Y value of the second V calibration patch, and U and V values that are neutral; and
   the storage medium further comprising a verifier module, execution of said verifier module configured to verify the luminance with the third and fourth V calibration patches.

36. The storage medium of claim 34 wherein the optical target further includes:
   a first color calibration patch having a YUV color value which sets the color vector to 135 degrees;
   a second color calibration patch having a YUV color value which sets the color vector to 315 degrees;
   a third color calibration patch having a YUV color value which sets the color vector to 45 degrees; and
   a fourth color calibration patch having a YUV color value which sets the color vector to 225 degrees; and
   the storage medium further comprising a verifier module, execution of said verifier module configured to verify color linearity with the first, second, third, and fourth color calibration patches.

* * * * *